US011907319B2

(12) United States Patent
Jackson (10) Patent No.: US 11,907,319 B2
(45) Date of Patent: Feb. 20, 2024

(54) INTERNET ACCESSIBLE BEHAVIOR OBSERVATION WORKPLACE ASSESSMENT METHOD AND SYSTEM TO IDENTIFY INSIDER THREAT

(71) Applicant: Gary Manuel Jackson, Pasadena, MD (US)

(72) Inventor: Gary Manuel Jackson, Pasadena, MD (US)

(73) Assignee: Gary Manuel Jackson, Gallatin, TN (US)

( * ) Notice: Subject to any disclaimer, the term of this patent is extended or adjusted under 35 U.S.C. 154(b) by 302 days.

(21) Appl. No.: 17/394,207

(22) Filed: Aug. 4, 2021

(65) Prior Publication Data

US 2022/0043878 A1    Feb. 10, 2022

Related U.S. Application Data

(60) Provisional application No. 63/103,438, filed on Aug. 6, 2020.

(51) Int. Cl.
*G06F 16/955* (2019.01)
*G06F 16/9535* (2019.01)
*G06F 16/906* (2019.01)

(52) U.S. Cl.
CPC ........ *G06F 16/9566* (2019.01); *G06F 16/906* (2019.01); *G06F 16/9535* (2019.01)

(58) Field of Classification Search
CPC .............. G06F 16/9566; G06F 16/906; G06F 16/9535; G06F 21/552; H04L 9/3231

(Continued)

(56) References Cited

U.S. PATENT DOCUMENTS 8,707,431 B2 * 4/2014 Stephens ............. H04L 63/1408
  726/22
8,887,286 B2 * 11/2014 Dupont ................... G06F 21/50
  726/25

(Continued)

OTHER PUBLICATIONS

Cummings, A., et, al, Insider Threat Study: Illicit Cyber Activity Involving Fraud in the U.S. Financial Services Sector, Carnegie Mellon University: Special Report, 2012.

(Continued)

*Primary Examiner* — Sheree N Brown (57) ABSTRACT

The present invention is a website-based, Internet browser accessible method of behavior assessment that consists of a user within an organization accessing the website-hosted Workplace Behavior Observation Form (WBOF) through the Universal Resource Locator (URL) address for the site to answer all form items about an observed individual in the same workplace to determine when characteristics are identified indicating the presence of and predisposition to insider threat. When the WBOF is completed, the user completing the WBOF submits the form which then is automatically scored and analyzed by pattern classifiers trained using a multitude of past examples of known insider threat characteristics across all WBOF items as input which, in turn, provide outputs of threat and risk values that are embedded in a report template in designated locations to form a completed assessment of threat, organizational vulnerabilities, and risk to the organization. The completed report is forwarded to the user's email address. The report may indicate the absence of likely insider threat or the presence of insider threat with information useful to support mitigation efforts.

15 Claims, 4 Drawing Sheets

(58) Field of Classification Search
USPC .......................................................... 707/722
See application file for complete search history.

(56) References Cited

U.S. PATENT DOCUMENTS

| | | | |
|---|---|---|---|
| 9,589,245 B2* | 3/2017 | Coden ................... | G06F 21/554 |
| 9,953,176 B2* | 4/2018 | Koo ....................... | G06F 21/552 |
| 10,270,790 B1* | 4/2019 | Jackson ............... | H04L 63/1425 |
| 10,387,667 B2* | 8/2019 | Koo ..................... | G06F 21/6209 |
| 11,005,872 B2* | 5/2021 | Dherange ................ | G06N 7/01 |
| 2013/0097709 A1* | 4/2013 | Basavapatna ....... | H04L 63/1441 |
| | | | 726/25 |
| 2017/0098093 A1* | 4/2017 | Koo .................... | G06F 21/6209 |
| 2018/0027006 A1* | 1/2018 | Zimmermann ..... | H04L 63/0227 |
| | | | 726/11 |
| 2018/0167402 A1* | 6/2018 | Scheidler ............... | G06N 20/00 |
| 2018/0239918 A1* | 8/2018 | Koo .................... | H04L 63/1441 |
| 2020/0358792 A1* | 11/2020 | Bazalgette ............. | G06N 20/00 |
| 2020/0382536 A1* | 12/2020 | Dherange ........... | H04L 63/1425 |
| 2020/0410620 A1* | 12/2020 | Liuzzo ................... | G06Q 10/02 |

OTHER PUBLICATIONS

Jackson, G.M. U.S. Appl. No. 63/103,438.

* cited by examiner

| | | | | | | |
|---|---|---|---|---|---|---|
| Person posts any organizational sensitive information/data on social media | Never | Once | Occasionally (1 per month) | Frequently (weekly) | Daily | Unknown |
| Person has received a security violation or verbal warning for not following security policy | Never | Once | Occasionally (1 per month) | Frequently (weekly) | Daily | Unknown |
| ... | | | | | | |
| Person takes workspace seriously | Never | Once | Occasionally (1 per month) | Frequently (weekly) | Daily | Unknown |

300 — (left column header)
301 — (right columns header)

INTERNET ACCESSIBLE BEHAVIOR OBSERVATION WORKPLACE ASSESSMENT METHOD AND SYSTEM TO IDENTIFY INSIDER THREAT

CROSS-REFERENCE TO RELATED APPLICATIONS

The present invention claims priority from U.S. Provisional Patent Application No. 63/103,438, filed Aug. 8, 2020, the contents of which are herein incorporated by reference in their entirety.

BACKGROUND OF THE INVENTION

Field of the Invention

The present invention relates to an Internet accessible website hosted Workplace Behavior Observation form (WBOF) that, when completed, determines the degree of presence of insider threat and is completed by a user within an organization based on behavioral and context characteristics of an insider who is observed. A completed and submitted WBOF has all item values processed by trained pattern classifiers that produce output values of threat, organizational vulnerabilities, and risk to the organization with values embedded into a written template report to produce a completed threat assessment that is directly emailed to the user by means of an Internet connection.

Description of the Related Art

Insider threat posed by employees, contractors, temporary help, part-time workers, interns, externs, or anyone associated with an organization with granted internal access to sensitive information, data, files, discussions, and presentations rivals external threat to organizations resulting from cyber-attacks and hacking. Internal threat presents risk of theft, sabotage/damage, or careless disregard for security policies allowing external access to internal files. The result can be, and often is, significant resulting in costly theft of or damage to sensitive, proprietary, or classified information.

Currently, the primary approach to detecting insider threat is to monitor and review an insider's organization network-based activities. These network-based applications focus on automatically monitoring access to network files, use of network files, saving and printing files, and anomalies that show departures from their "normal" behaviors, among other network activities.

However, numerous past successful insider theft and damage case examples reveal that malicious and careless behaviors may not be network-related or network detectable. Despite using the network to find sensitive files and downloads, the insider typically has access and authorization to do so. Given approved access to network files, data, and information, misuse on the network by insiders is difficult to detect, at least in time to prevent its occurrence. Simply put, as examples, physically copying files by means of download to a memory device, taking thousands of images of a workstation screen displaying sensitive information with a smart phone, or taking documents home to copy overnight and return the next day, among a multitude of similar behaviors, are not detectable using network monitoring.

According to Carnegie Mellon's Software Engineering Institute's study on insider threat (Cummings, Lewellen, McIntire, Moore, & Trzeciak, 2012), it takes an average of almost thirty-two (32) months for insider damage to be detected by the victim organization, and most cases have not been discovered through network or technical means but by later audit. This finding indicates that current network-monitoring methods used to detect insider threat neither anticipate nor detect costly insider theft and damage in a timely manner to assist mitigation to prevent losses. Although network monitoring is important, the approach needs to be supplemented with a more proactive and effective non-network method. This behavioral and observation system and method described herein represents a such a new approach.

SUMMARY OF THE INVENTION

The present invention represents a non-network-based, Internet website accessible method using an applied behavior analysis/counterintelligence Subject Matter Expert (SME)-constructed Workplace Behavior Observation Form (WBOF) wherein a user within an organization completes the presented WBOF items based on observations of a specific insider. The form, comprised of observed behaviors and antecedent precipitating events/situations associated with insider threat, when completed is automatically processed by trained pattern classifiers with outputs identifying characteristics associated with those in a work setting who pose a risk of conducting theft and damage to an organization's sensitive, proprietary, or classified information/data whether by intent or by careless disregard for network security policy. Likewise, WBOF analysis can indicate the absence of threat or risk.

DETAILED DESCRIPTION

Although the vast majority of detection methods in use today focus on identifying specific types of malicious activities on an organization's network, a large percentage of insider-related theft or sabotage examples have occurred in the work setting without the unauthorized use of a network. The behaviors, events, and situations leading to loss in past examples are observable in the workplace and are incorporated into the WBOF as form items to rate by a user.

Figure 1:
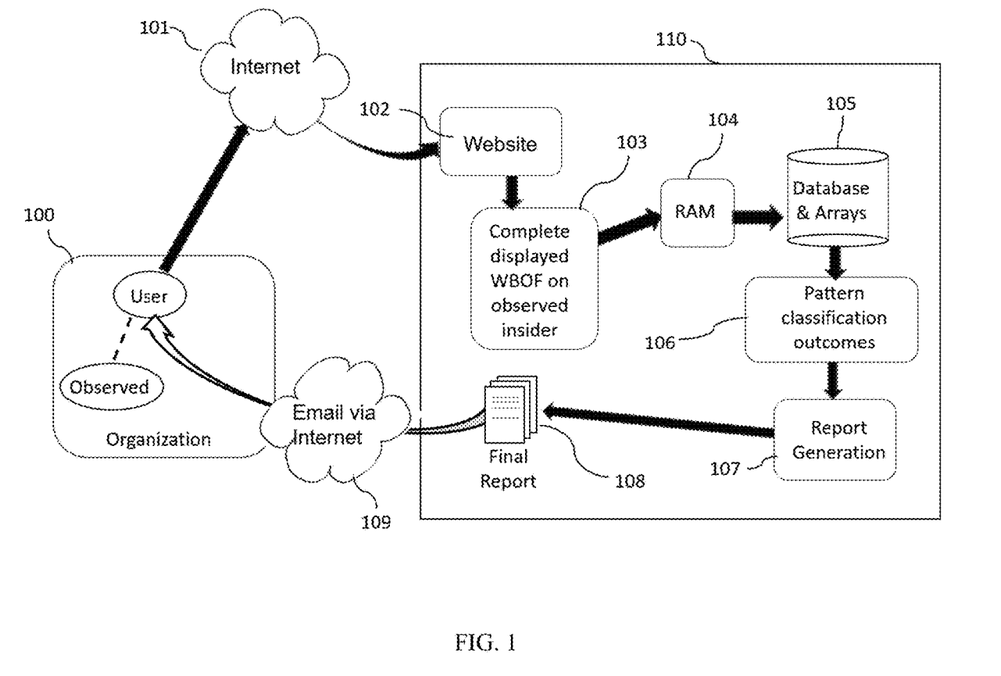
FIG. 1 is a flow diagram illustrating the overall process of WBOF Internet website accessibility and functioning from completion to report delivery.

FIG. 1 displays the overall user accessibility beginning with accessing the website hosted WBOF through the end result of delivering the completed assessment report to the user. Block 110 represents a non-transitory computer-readable storage medium having computer executable instructions to contain and process all responses made by the user on the WBOF and depending on written specifics of the assessment, assessment instructions, data arrays, pattern classification processing of the data arrays, report generation, and link to the user to forward the completed threat assessment report.

Implementations or any part of implementations of the above disclosure can take the form of a computer program product accessible from, for example, a computer-usable or computer-readable medium. A computer-usable or computer-readable medium can be any device in connection with any processor. The medium can be an electronic, magnetic, optical, electromagnetic, or a semiconductor device. Other suitable mediums are also available. Such computer-usable or computer-readable media can be referred to as non-transitory memory or media and may include RAM or other volatile memory or storage devices that may change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

Block 100 displays a user within an organization who initiates a WBOF assessment of a specific insider based on observations in the workplace by accessing the desired website which presents the WBOF on the user's workstation or personal computer (PC) display via an Internet Uniform Resource Locator (URL) address accessed by the user using a browser. Block 101 displays the Internet as a means to access the desired website containing the WBOF. Block 102 displays the connection from the Internet to the WBOF-based website which consists of SME-developed items based on the extraction of all items from past accounts of successful workplace-based theft and sabotage and careless disregard for security policies. The presented WBOF connection allows the user in Block 100 to access and answer all Block 103 presented WBOF items.

Block 104 depicts the system contained within a computer including Random Access Memory (RAM) used for temporary storage of information as it is completed and then forwarded to the database in block 105 for permanent storage and to contain data that assists in WBOF entries processing. The response values for a completed WBOF stored in the database are sent as input to pattern classifiers displayed in Block 106. Here, input scores are transformed to a data array items vector that is then processed by all trained pattern classifiers in block 106. The outputs of all pattern classifiers provide transformed values representing degree of threat, organizational vulnerabilities, and individual risk to the organization. The pattern classifier output values are then transformed into plug-in values and added in pre-specified locations of a written report template as displayed in Block 107. This process ends with the completion of a written assessment report specific to the insider who was observed and assessed using the WBOF and includes ratings on all items, the pattern classification results displaying degree of threat, organization vulnerabilities, graphics, and risk to the organization posed by the observed individual, and specific scored items of concern that may be used for mitigation. In Block 108 the finished report is forwarded automatically through the Internet to the user's pre-specified email address to complete the assessment process.

Figure 2:
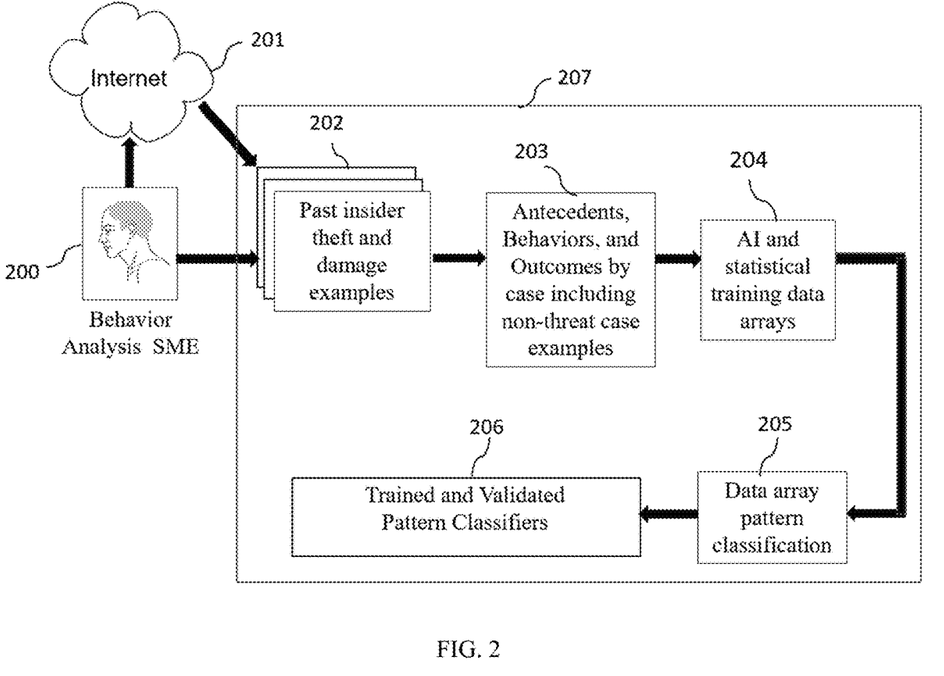
FIG. 2 is a functional diagram of how WBOF items are developed by a SME from past examples of those successful in insider theft and damage through the process of developing pattern classifiers taking WBOF items as input and threat and risk values as outcomes.

FIG. 2 displays the method by which the Subject Matter Expert (SME) develops the WBOF items. Block 207 represents the SME's computer which contains all processing elements represented in blocks all blocks 202-206. These elements are used to identify and collect all past accounts of insider theft and damage, the extraction process used to identify all antecedent precursors and behaviors leading to the theft and damage, the process of preparing WBOF items from these extractions, the process of completing the data arrays for pattern classification, and the pattern classification process to result in trained and validated pattern classifiers that process WBOF entries and transforming item values to output values of threat, organizational vulnerability, and organizational risk.

The first step depicted in block 200 depicts the behavior analysis and counterintelligence SME required to identify, word, and place WBOF items into final form. To assist in this process, the SME searches for past successful insider threat examples by means of Internet searches (Block 201) to identify and collect text documents as well as other sources describing past examples of insider actions resulting in malicious loss and damage and loss and damage caused by those who disregarded network security practices that present paths for external hackers to enter the organization's network. Collected examples used for analysis can take the form of media articles, books, legal records, transcripts, published interviews, as well as other types of descriptions. Block 202 depicts the finished collection of past examples. In block 203 the SME organizes all obtained texts into single examples where one example is equivalent to one incident and with all texts referring to a single incident forming one example, then the SME extracts the who, what, when, where, and how of each example. These extractions provide the background necessary for identifying and writing the discovered antecedent precursors and behaviors resulting in insider theft and damage.

The SME then analyzes antecedent precursor events and situations leading to the theft and damage, the actual insider behaviors causing the theft and damage, and the consequences of the insider's actions. The extracted antecedent precursors and behaviors are to be used for WBOF items, while the consequences of each example indicate the degree of theft and damage represented. The SME then processes one example at a time and prepares potential WBOF items for this one example then repeats the process for all remaining examples in an identical manner. At the completion, the SME words and finalizes all potential items as WBOF workplace observable assessment items across all examples.

In Block 204 the extracted and worded items across all examples are then used to populate a data array with each row representing a distinct example and each column representing a unique WBOF item. The scored consequences for each example are added as columns at the end of each row representing outcomes for each row example. Outcomes can include threat/no threat, degree of organizational vulnerabilities present, risk scores for overall organizational risk, as well as other outcomes surfacing during SME review of past examples. In other embodiments, data arrays for pattern classification can also be constructed by reversing row and columns as well as being represented by other forms of arrays that can be populated with the presence/absence and scaled values for the SME's unique items.

Block 205 depicts the data array pattern classification process. Whether the process used is statistical pattern classification, machine learning, or the use of supervised learning artificial neural network methodology such as a back-propagation network (BPN), and any other pattern classification procedure, the purpose is to identify patterns enabling the prediction of risk and threat outcomes based on WBOF item input data within each example row across all rows of the data array. The pattern classifiers are trained by dividing the dataset into training and testing cases in separate datasets. Pattern classification occurs by using the training set and tested on a separate testing set that has not been used for training to receive a fair assessment of the robustness of the resulting pattern classification process. As those experienced with pattern classification are aware, there is a variety of methods used for such training that are relevant. A final validation set is used for final testing. This final set is comprised of actual insider threat cases that have been rated by a third party using the WBOF form and processed through the presented application to derive ratings, reports, and warnings.

Block 206 depicts the completed training and testing of the finalized pattern classifiers. These pattern classifiers are now ready for transforming completed WBOF values as input into output values providing the degree of threat and risk present for the observed individual based on all WBOF entries.

Figure 3:
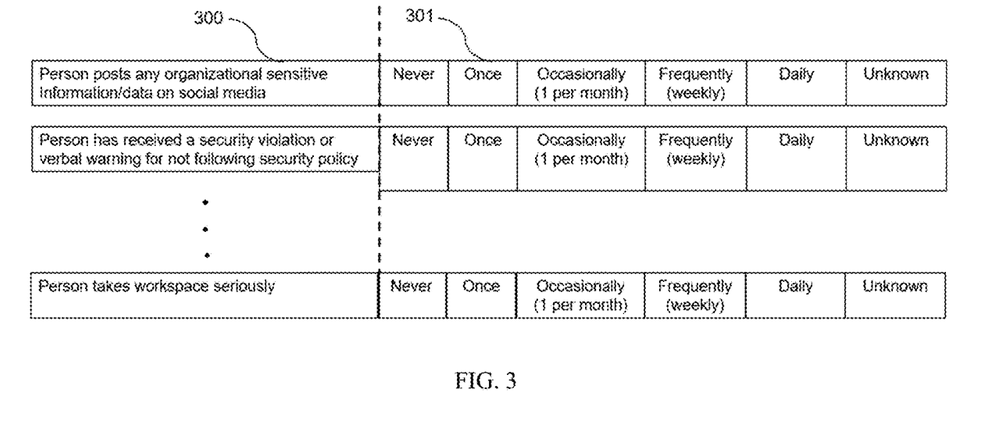
FIG. 3 is a view of a sample of WBOF items and how items are scored with the user selecting one answer for each item.

FIG. 3 provides a sample of items in the WBOF derived from the SME-processed antecedents and behaviors of each example which are formulated into SME-written WBOF items. Because antecedents and behaviors are extracted across multitudes of example cases, items can number in the hundreds. These items are grouped by content areas. These overall content areas are used to form high-level screening items. Items forming each overall content area are included within the respective content areas and serve as drop-down items. Drop-down items are used for clarification when a screening item is rated as present in any degree. Therefore, completing a WBOF consists of the observer completing screening items and then completing any drill-down items for a screening item when necessary.

Block 300 depicts sample WBOF items on the left side of the form and Block 301 depicts requested responses by the user on the right side. There are a variety of items presented in the WBOF to range from simple YES and NO items to Likert scaled items with ranked items scored from zero to numeric five and "unknown" as a response to indicate the user does not have sufficient information to rate an item. Each worded item presented on the WBOF then is either rated as being present or absent or scaled in such a way that severity/significance is captured.

Figure 4:
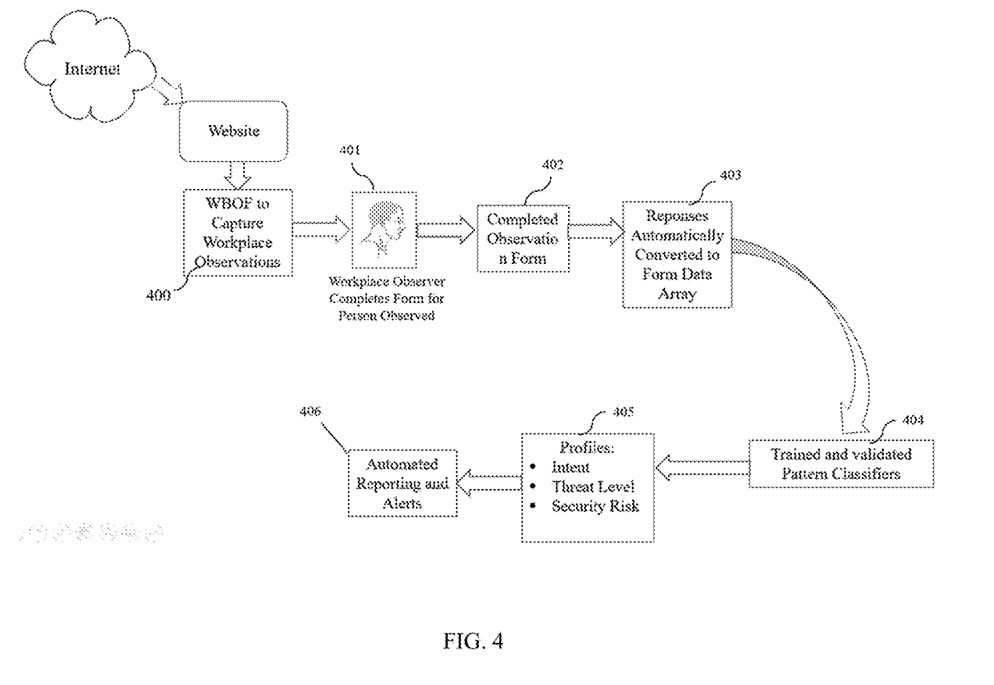
FIG. 4 is a functional diagram of the use of the URL accessible website based WBOF, with presentation of items, processing of item scores once completed by pattern classifiers, and the automated development of reporting and report delivery.

FIG. 4 presents the overall process of completing the WBOF to obtain results, reports, and alerts. Block 400 depicts the first step in the actual use of the completed application in the workplace. The WBOF is accessed on a website through an Internet connection to the URL and displayed on the user's workstation/PC display. Once the WBOF is accessed on the website, Block 401 illustrates the user answering all items presented. The WBOF serves to guide a user, such as a supervisor/manager, through the observational process and who is in contact and has had frequent interactions with the insider being assessed. The form is not intended for any user to enter the workspace and start asking pointed questions about a person being assessed including any questions directed at a co-worker, including the observed individual. It is a stand-off form only based on observations of a user who is knowledgeable of the observed insider with no interaction with the observed.

The WBOF is presented on a PC, workstation, and other similar devices such as a smart phone and computer tablet and viewed on the device's display. One item at a time is presented to require focus for only that item. Once answered, the next item is presented. A selection is made by "clicking" on the appropriate response that corresponds with the observation of the person being assessed. All responses are encrypted as well as any identifying data and any reports to maintain confidentiality.

Block 402 illustrates a completed WBOF. The item rating results are transformed as a single vector in Block 403 that is then automatically presented to pattern classifiers in Block 404 for processing to obtain output values. One trained pattern classifier may produce projections of threat/no threat, another trained pattern classifier will produce severity of threat, another trained pattern classifier will project loss and damage, another will present the projected time frame of the threat from imminent to long-term, while another may present degree of organizational risk and vulnerability projected for the observed person being assessed.

In Block 405, pattern classifiers outputs are captured and in Block 406 the process of assessment is completed when these values are inserted in the appropriate locations of a pre-written report template and then the completed written assessment report is forwarded by means of Internet to the user-provided email address. When significant indications of insider threat are present, alerts may be provided and take the form of email and text messaging to any predesignated individuals in addition to the user when user indicated.

When there are too many "unknowns" selected as responses to WBOF items, the user is automatically informed by email that the form has not been completed with enough items to conduct an assessment and the data array is not forwarded to the pattern classification stage and no report is generated. The user then has the opportunity to complete the WBOF with more responses. In the event that more items cannot be completed, the user is notified there is insufficient information on the form to conduct a valid assessment.

What is claimed is:

1. An Internet web-based method that identifies an insider in an organization workplace who is presenting a threat of malicious theft and damage and a non-malicious person who presents theft and damage vulnerabilities within the organization because of careless disregard for security policies by means of a user completing a workplace behavior observation form (WBOF) on an observed insider presented via an Internet web-based application, when completed, all WBOF item responses are processed by trained pattern classifiers that produce threat, organizational vulnerabilities, and organizational risk output values embedded in pre-specified locations within a pre-written report template thereby completing a written threat assessment that is then forwarded through Internet email as an attachment to the user's email address to assist in mitigation and comprising steps of:

analyzing collected past case examples of successful insider theft and damage Within organization workplaces by a subject matter expert (SME) trained in behavior analytics and counterintelligence wherein each case is examined as one of many examples;

analyzing and extracting precursor antecedents and behaviors, with all analysis completed by the SME, leading to organization theft and damage for each collected example and transforming antecedent precursors and behaviors leading to loss into worded items for the WBOF across all examples; creating data arrays with WBOF items as columns and examples used for extraction as rows and adding threat and risk outcomes for each example row; training pattern classifiers with examples of insider loss used for extraction whereby data arrays are created with WBOF items as columns and examples of loss used for extraction as rows and adding threat and risk outcomes for each example row, and embedding the completed WBOF into a website accessible by the user via Internet and a browser; monitoring all items of a WBOF being rated by the user and when the WBOF is completed processes the resultant responses vector as input to trained pattern classifiers to produce threat and risk outcome values; and automatically embedding outcome values into a pre-written threat assessment report template in specified locations thereby completing the threat report which is forwarded as an attachment to the user's email address, and the SME analyzes all extracted antecedent precursors and behaviors and classifies into cohesive categories by similarity with categories formed into a hierarchy whereby top-level themes with sub themes fitting a specific top-level theme are nested under the corresponding top-level theme wherein the SME then finalizes top-level category themes into WBOF screening items and sub themes as detailed clarifying items under each screening item, words each theme into assessment item format, and adds organizational background items to finalize the WBOF for use and embeds the finished assessment form within the specific WBOF website.

2. The method of claim 1, further comprises wherein a subject matter expert (SME) trained in behavior analytics and counterintelligence analyzes and categorizes past text-based accounts/reports of insider theft and damage and extracts antecedent precursors and behaviors leading to the theft and loss across all example cases.

3. The method of claim 1, further comprises wherein data arrays are created with all WBOF items as columns and all past examples used for extraction as rows with outcome columns added to represent levels of threat, vulnerability, and risk encountered for each example and data array cells populated with numeric one if that column WBOF item was present for the row example and numeric zero when not present and other arrays' cells populated with numeric zero indicating the item is not relevant for the observed and scaled values from numeric one to numeric five indicating degree of presence from occasionally numeric one to daily numeric five.

4. The method of claim 1, further comprises wherein all populated data arrays are presented for pattern classification training by a plethora of pattern classification methods to include but not limited to Artificial Neural Networks (ANN), machine learning, and correlational analyses to identify patterns that present outcome threat and risk values of degree of threat, organizational vulnerabilities, and overall organizational risk presented by the observed when presented with WBOF item scoring as input.

5. The method of claim 1, further comprises wherein a user completes a WBOF by answering all items on an observed insider and submits the form for analysis which in turn has all WBOF item scoring processed by the trained pattern classifiers that produce threat, organizational vulnerabilities, and risk to the organization values which, when embedded into a pre-written assessment report template in pre-determined locations, completes a written threat assessment report that is then emailed via Internet email as an attachment to the user who completed the WBOF.

6. A system for Internet web-based that identifies an insider in an organization workplace who is presenting a threat of malicious theft and damage and a non-malicious person who presents theft and damage vulnerabilities within the organization because of careless disregard for security policies by means of a user completing a workplace behavior observation form (WBOF) on an observed insider presented via an Internet web-based application, when completed, all WBOF item responses are processed by trained pattern classifiers that produce threat; organizational vulnerabilities, and organizational risk output values embedded in pre-specified locations within a pre-written report template thereby completing a written threat assessment that is then forwarded through Internet email as an attachment to the user's email address to assist in mitigation and comprising: a computer; a processor; a web-based link Via the Internet further comprising:

analyzing collected past case examples of successful insider theft and damage within organization workplaces by a subject matter expert (SME) trained in behavior analytics and counterintelligence wherein each case is examined as one of many examples; analyzing and extracting precursor antecedents and behaviors, with all analysis completed by the SME, leading to organization theft and damage for each collected example; transforming antecedent precursors and behaviors leading to loss into worded items for the WBOF across all examples; creating data arrays with WBOF items as columns and examples used for extraction as rows and adding threat and risk outcomes for each example row; training pattern classifiers with examples of insider loss used for extraction whereby data arrays are created with WBOF items as columns and examples of loss used for extraction as rows; adding threat and risk outcomes for each example row, and embedding the completed WBOF into a website accessible by the user Via Internet and a browser; monitoring all items of a WBOF being rated by the user and when the WBOF is completed processes the resultant responses vector as input to trained pattern classifiers to produce threat and risk outcome values and automatically embedding outcome values into a pre-written threat assessment report template in specified locations and completing an automatically created threat report which is forwarded as an attachment to the user's email address the SME analyzes all extracted antecedent precursors and behaviors and classifies into cohesive categories by similarity with categories formed into a hierarchy whereby top-level themes with sub themes fitting a specific too-level theme are nested under the corresponding top-level theme wherein the SME then finalizes tap-level category themes into WBOF screening items and sub themes as detailed clarifying items under each screening item, words each theme into assessment item format, and adds organizational background items to finalize the WBOF for use and embeds the finished assessment form within the specific WBOF website.

7. The system of claim 6, further comprises wherein a subject matter expert (SME) trained in behavior analytics and counterintelligence analyzes and categorizes past text-based accounts/reports of insider theft and damage and extracts antecedent precursors and behaviors leading to the theft and loss across all example cases.

8. The system of claim 6, further comprises wherein data arrays are created with all WBOF items as columns and all past examples used for extraction as rows with outcome columns added to represent levels of threat, vulnerability, and risk encountered for each example and data array cells populated with numeric one when that column WBOF item was present for the row example and numeric zero when not present and other arrays' cells populated with numeric zero indicating the item is not relevant for the observed and scaled values front numeric one to numeric five indicating degree of presence from occasionally-numeric one to daily numeric five.

9. The system of claim 6, wherein further comprises all populated data arrays are presented for pattern classification training by a plethora of pattern classification methods to include but not limited to Artificial Neural Networks (ANN), machine learning, and correlational analyses to identify patterns that present outcomes threat and risk values of degree of threat, organizational vulnerabilities, and overall organizational risk presented by the observed when presented with WBOF item scoring as input.

10. The system of claim 6, wherein further comprises a user completes a WBOF by answering all items on an observed insider and submits the form for analysis which in turn has all WBOF item scoring processed by the trained pattern classifiers that produce threat, organizational vulnerabilities, and risk to the organization values which, when embedded into a pre-written assessment report template in pre-determined locations, completes a written threat assessment report that is then emailed via Internet email as an attachment to the user who completed the WBOF.

11. A non-transitory computer-readable medium for an Internet web-based method that identifies an insider in an organization workplace who is presenting a threat of malicious theft and damage and a non-malicious person who presents theft and damage vulnerabilities within the organization because of careless disregard for security policies by means of a user completing a workplace behavior observation form (WBOF) on an observed insider presented via an Internet web-based application, when completed, all WBOF item responses are processed by trained pattern classifiers that produce threat, organizational vulnerabilities, and organizational risk output values embedded in pre-specified locations within a pre-written report template thereby completing a written threat assessment that is then forwarded through
Internet email as an attachment to the user's email address to assist in mitigation and comprising:
 analyzing collected past case examples of successful insider theft and damage within organization workplaces by a subject matter expert (SME) trained in behavior analytics and counterintelligence wherein each case is examined as one of many examples; analyzing and extracting precursor antecedents and behaviors, with all analysis completed by the SME, leading to organization theft and damage for each collected example; transforming antecedent precursors and behaviors leading to loss into worded items for the WBOF across all examples; creating data arrays with WBOF items as columns and examples used for extraction as rows and adding threat and risk outcomes for each example row; training pattern classifiers with examples of insider loss used for extraction whereby data arrays are created with WBOF items as columns and examples of loss used for extraction as rows and adding threat and risk outcomes for each example row; embedding the completed WBOF into a website accessible by the user via Internet and a browser; monitoring a items of a WBOF being rated by the user and when the WBOF is completed processes the resultant responses vector as input to trained pattern classifiers to produce threat and risk outcome values; and
 automatically embedding outcome values into a pre-written threat assessment report template in specified locations thereby completing the threat report which is forwarded as an attachment to the user's email address the SME analyzes all extracted antecedent precursors and behaviors and classifies into cohesive categories by similarity with categories formed into a hierarchy whereby top-level themes with sub themes fitting a specific top-level them are nested under the corresponding top-level,
 theme wherein the SME then finalizes top-level category themes into WBOF screening items and sub themes as detailed clarifying items under each screening item, words each theme into assessment item format, and adds organizational background items to finalize the WBOF for use and embeds the finished assessment form within the specific WBOF website.

12. A non-transitory computer-readable medium of claim 11, further comprises wherein a subject matter expert (SME) trained in behavior analytics and counterintelligence analyzes and categorizes past text-based accounts/reports of insider theft and damage and extracts antecedent precursors and behaviors leading to the theft and loss across all example cases.

13. A non-transitory computer-readable medium of claim 11, further comprises wherein data arrays are created with all WBOF items as columns and all past examples used for extraction as rows with outcome columns added to represent levels of threat, vulnerability, and risk encountered for each example and data array mils populated With numeric one if that column WBOF item was present for the row example and numeric zero when not present and other arrays' cells populated with numeric zero indicating the item is not relevant for the observed and scaled values from numeric one to numeric five indicating degree of presence from occasionally numeric one to daily numeric five.

14. A non-transitory computer-readable medium of claim 11, further comprises wherein-all populated data arrays are presented for pattern classification training by a plethora of pattern classification methods to include but not limited to Artificial Neural Networks (ANN), machine learning, and correlational analyses to identify patterns that present outcome threat and risk values of degree of threat, organizational-vulnerabilities, and overall organizational risk presented by the observed when presented with WBOF item scaring as input.

15. A non-transitory computer-readable medium of claim 11, further comprises wherein a user completes a WBOF by answering all items on an observed insider and submits the form for analysis which in turn has all WBOF item searing processed by the trained pattern classifiers that produce threat, organizational vulnerabilities, and risk to the organization values which, when embedded into a pre-written assessment report template in pre-determined locations, completes a written threat assessment report that is then emailed via Internet email as an attachment to the user who completed the WBOF.

* * * * *